(No Model.) 3 Sheets—Sheet 1.
J. R. CARSON & J. H. DENMAN, Jr.
SULKY FRAME FOR AGRICULTURAL IMPLEMENTS.
No. 545,051. Patented Aug. 27, 1895.
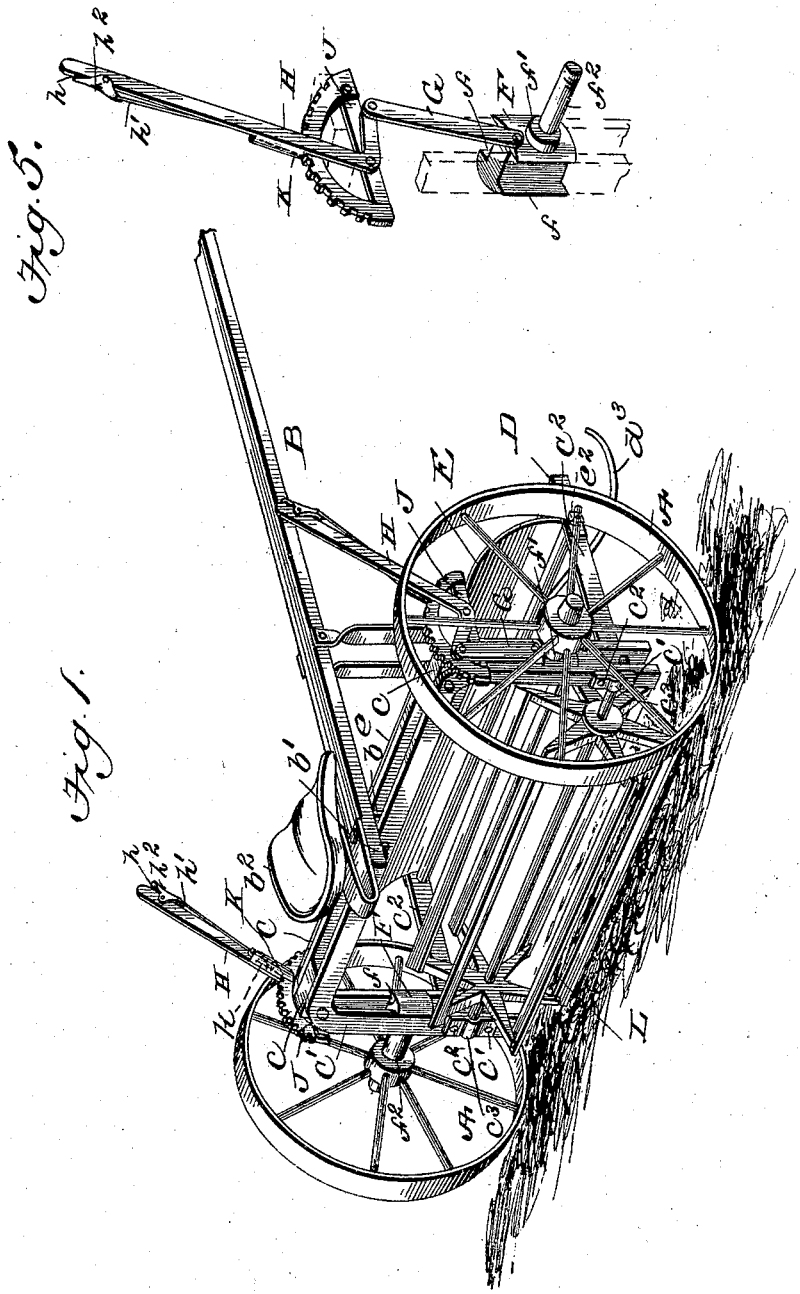

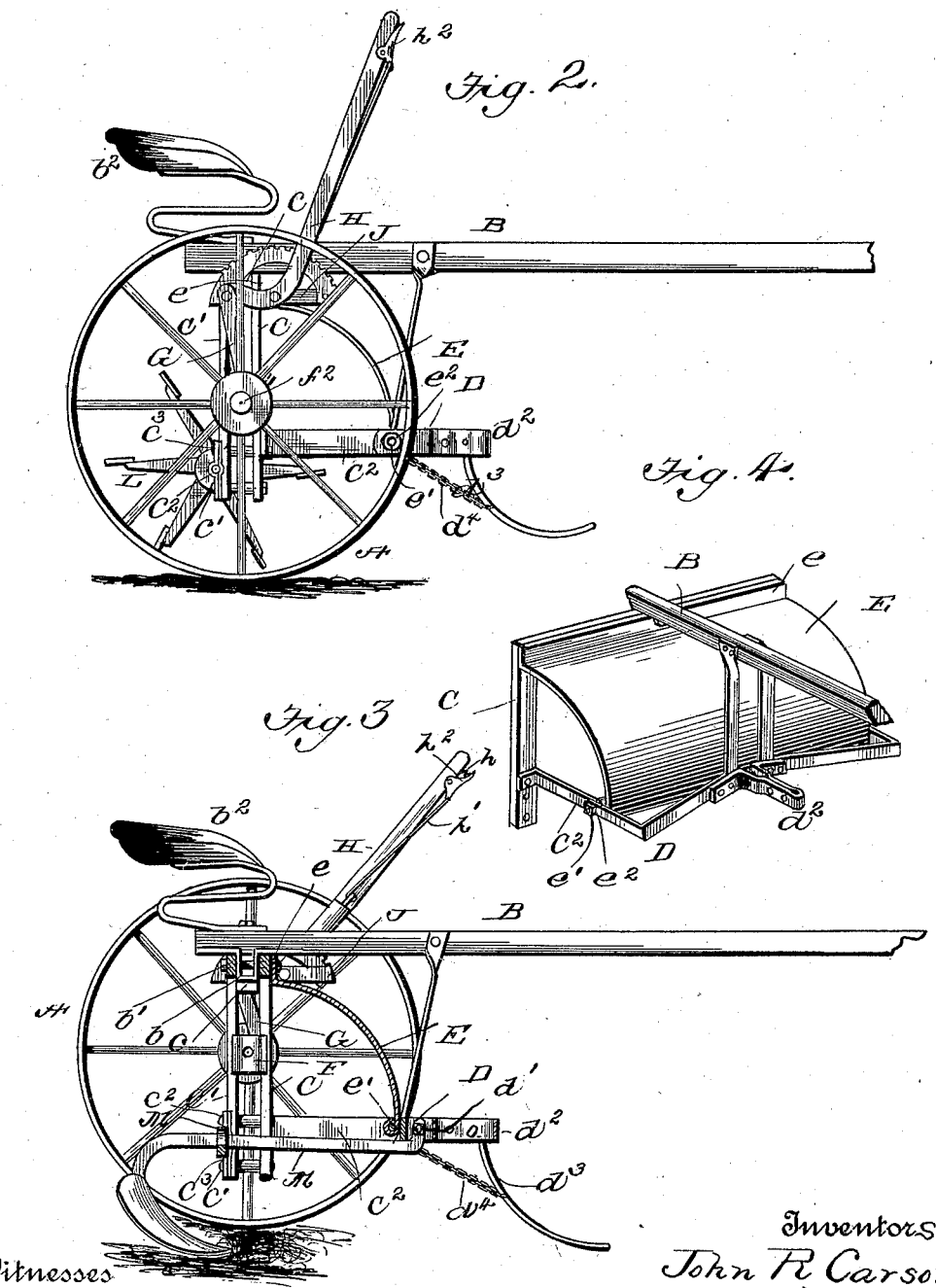

(No Model.) 3 Sheets—Sheet 3.

J. R. CARSON & J. H. DENMAN, Jr.
SULKY FRAME FOR AGRICULTURAL IMPLEMENTS.

No. 545,051. Patented Aug. 27, 1895.

Witnesses

Inventors
John R. Carson
and
Jackson H. Denman Jr.
by
J. F. Beale Attorney

UNITED STATES PATENT OFFICE.

JOHN RICHARD CARSON AND JACKSON HARVEY DENMAN, JR., OF CHASE, TEXAS.

SULKY-FRAME FOR AGRICULTURAL IMPLEMENTS.

SPECIFICATION forming part of Letters Patent No. 545,051, dated August 27, 1895.

Application filed December 11, 1894. Serial No. 531,493. (No model.)

*To all whom it may concern:*

Be it known that we, JOHN RICHARD CARSON and JACKSON HARVEY DENMAN, Jr., citizens of the United States, residing at Chase, in the county of Bosque and State of Texas, have invented certain new and useful Improvements in Sulky-Frames for Agricultural Implements; and we do hereby declare the following to be a full, clear, and exact description of the invention, such as will enable others skilled in the art to which it appertains to make and use the same.

Our invention relates to sulky-frames adapted for mounting independent agricultural implements.

The object of our invention is to provide a new and improved sulky-frame adapted for the attachment of several agricultural implements and provided with means for elevating or lowering the frame and the implement thereto attached, whereby the latter is brought in contact with the soil or elevated above such contact.

It is also our object to provide a sulky-frame of this description whereby we are enabled, when said implement is in contact with the soil, to regulate its pressure thereon or, when desired, to throw the entire weight upon the implement by raising the wheels of the sulky-frame above the contacting portion of said implement.

It is also our object to provide a sulky-frame of this description in which the horizontal or body portion of the main frame shall pass or bridge over the dependent implement, and whereby we are enabled to dispense with an axle to connect the wheels.

Figure 6:
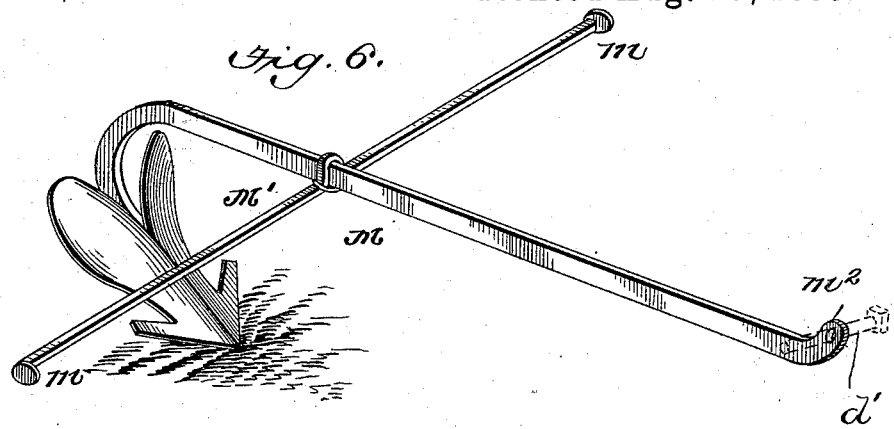
Figure 7:
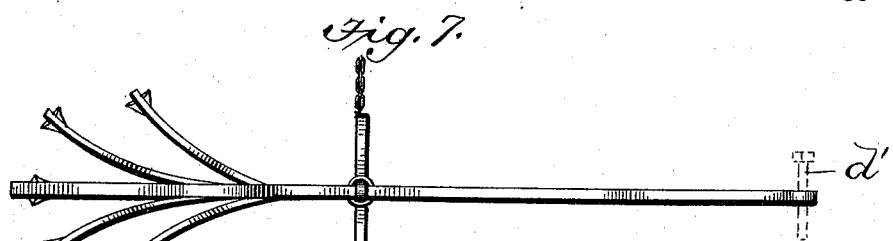
Figure 8:
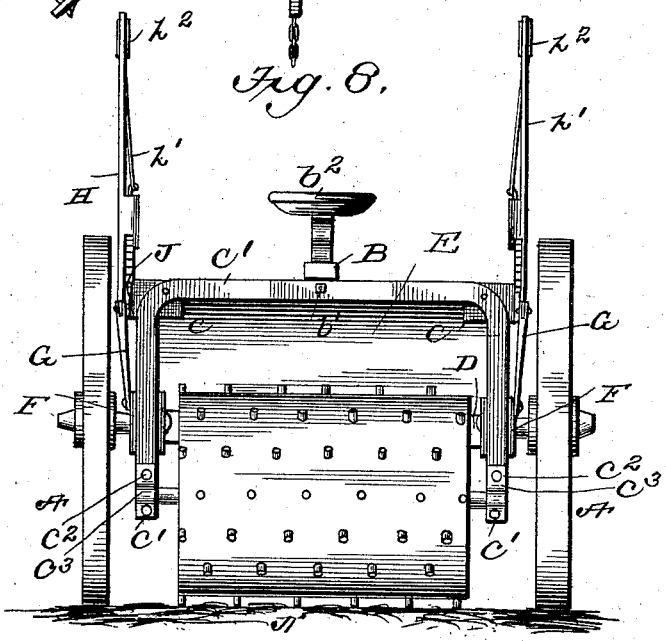

In the accompanying drawings, Figure 1 is a perspective view. Fig. 2 is a side elevation showing the stalk-cutter attached. Fig. 3 is a side elevation showing a plow attached. Figs. 4, 5, and 6 are detailed views. Fig. 7 is a modification, and Fig. 8 is a rear view showing a rotary harrow attached.

Referring more particularly to the drawings, A A denote the wheels mounted in sliding boxes, which are secured to the main frame, as hereinafter described. B denotes the tongue, secured to said frame by an angle-iron $b$ and bolt $b'$, and has mounted thereon the driver's seat $b^2$. The main frame is composed of two upright iron frames C C', bent in rectangular form, their ends extending downwardly, arranged in parallel relation, and separated from each other by blocks $c\ c$, which are interposed between their upper corners and rigidly secured in this position by suitable bolts. The lower ends of said frames are secured together by screw-bolts $c'$. The lower end of the frame C' has secured thereto by said bolts $c'$ and screw-bolts $c^2$ plates $c^3$, formed with bearings for the shaft or axle of the stalk-cutter or rotary harrow. Said bearings also serve as means for securing the supports of the plow or cultivator.

$C^2\ C^2$ denote two frames forming together the means for communicating the draft to the main frame. Said frames are bent in angular shape, as shown in Fig. 4, their rear ends being bolted to the main frame near its lower ends at a point in line with the bearings for the stalk-cutter shaft or plow or cultivator supports. The forward parts of said frames extend in front of the main frame, where, at a point about midway of said front, they approach near together and are bent upwardly, their ends being secured to the tongue. At the point of said upward bend the frames are tied or braced together by flanges formed integral with the draft-beam, as hereinafter described.

D denotes the draft-beam, which is formed of a single flat piece of metal doubled upon itself and having its ends bent outwardly to form flanges. Said flanges are bolted to the forward parts of the frames $C^2\ C^2$. At the point of separation of said ends or flanges a V-shaped opening is formed between them, which serves to admit the forward end of a plow, cultivator, harrow, or other beam.

$d'$ represents a bolt or key, which passes through said draft-beam at this point and serves for the attachment of said plow or other beam, as hereinafter described.

$d^2$ denotes an eye or clevis formed in the end of the draft-beam.

$d^3$ denotes drag-hooks, detachably pivoted to said beam and hung by chains $d^4$ from the frames $C^2\ C^2$.

E denotes a detachable sheet-iron fender, secured at its upper end to the main frame by the bolt $b'$, which passes through a flange $e$ formed on said fender. The lower end of the fender has a rounded flange formed thereon, through which passes a detachable rod $e'$, having screw-threaded ends which pass through perforations in the frames $C^2 C^2$. Nuts $e^2 e^2$ serve to secure said rod and lower end of the fender to the sides of said frames.

F F denote vertically-movable boxes (shown in detail in Fig. 5) having channels or ways $f f$ formed in front and rear, a washer $f'$ and a spindle $f^2$, secured thereto or formed integral therewith. Said boxes are designed to move between the vertical portions of the frames C C', said portions fitting in said channels and preventing the lateral movement or escape of said boxes.

G G denote arms, pivoted at their lower ends to said boxes above the spindles and pivoted at their upper ends to bent end of levers H H. Said levers are pivoted to arms J J, which are rigidly secured upon each side of the main frame to the blocks $c c$. Said bar has rigidly bolted thereto a semicircular rack-bar, the teeth of which engage with a pawl or plunger K. Said plunger is actuated by a spring $h$ and rod $h'$ to engage with the teeth of said rack-bar, and is released therefrom by the driver operating the finger-lever $h^2$, which compresses said spring and lifts said rod.

L denotes the stalk-cutter, which is mounted in bearings formed in the plates $c^3$.

M denotes the plow, having a cross-brace M', secured to the plow-beam and extending at right angles thereto an equal distance upon each side. The ends of said brace are bent upwardly to form flanges $m$. Said brace is adapted to attach the plow to the main frame, the ends thereof resting in the bearings formed in the plates $c^3$, the flanges $m$ preventing the lateral escape of said ends. The forward end of the beam is bent upwardly to form a lug $m^2$, which is perforated. Said lug is adapted to fit into the V-shaped opening formed in the draft-beam and is secured in this position by the bolt or key $d'$.

N denotes a rotary harrow mounted in bearings formed in the plates $c^3$.

It will be seen that by our construction the draft is thrown directly, in the first instance, upon the draft-beam, and as we dispense with the use of an axle the draft is transmitted to the lower part of the main frame and directly in a horizontal line with the implement used. Again, when the plow or other implement having a beam is used, a purchase is given for such directly upon the draft-beam D, thus relieving the bearings on the main frame, which, in these instances, act chiefly as supports. It is evident in this connection that we could also use a cultivator in combination with our sulky-frame by having a divided beam and two or more cultivators attached, as shown in the modification in Fig. 7. Instead of having the cross-brace M' rigid, we may make it flexible or yielding by using a chain, as shown in Fig. 7, the ends of which are secured to the plates $c^3$.

It will be also seen that by our mechanism for raising the wheels we are enabled to throw the entire weight of the sulky-frame and wheels directly upon the implement, as shown in Fig. 3, or we can throw a part of such weight thereon and part on the wheels. Again, when desired, the driver can operate the lever on one side only, and thus raise or lower one wheel without affecting the other.

It is evident that by dispensing with an axle and connecting the wheels by the raised body or horizontal portion of the main frame we greatly economize space and material and remove obstructing parts which heretofore interfered with the attachment and vertical adjustment of the several implements.

Having shown and described our invention, what we claim, and desire to secure by Letters Patent, is—

1. In a sulky-frame of the character described, the combination of the arched axle forming the main frame and composed of two inverted U-shaped frames arranged in parallel relation and between which are mounted the wheels, bearings arranged at the lower ends of said frames for attachment of a cotton chopper plow or other implement and a draft frame connected with said lower ends, substantially as shown and described.

2. In a sulky-frame of the character described, the combination of a divided arched axle having its side ends separated by blocks and forming ways, the dovetailed sliding boxes mounted in said ways and adjustably connected to said blocks by pivoted arms, substantially as shown and described.

3. In a sulky-frame of the character described, the combination of the divided arched axle having bearings arranged at its lower ends for attachment of the several implements, the draft-frame composed of two frames attached to said lower ends and secured to the tongue, the draft beam D uniting said two frames to form the draft frame and adapted to receive the end of a plow or cultivator beam.

4. In a sulky-frame of the character described the combination of the divided arched axle, the tongue secured between the divisions of the axle and connected to the draft frame and the draft frame and the beam D, substantially as shown and described.

In testimony whereof we affix our signatures in presence of two witnesses.

JOHN RICHARD CARSON.
JACKSON HARVEY DENMAN, JR.

Witnesses:
J. J. JACKSON,
JACK. B. POOL.